United States Patent [19]

Laurent et al.

[11] Patent Number: 4,820,526

[45] Date of Patent: * Apr. 11, 1989

[54] METHOD OF IMPROVING FEATHERING IN BIRDS

[75] Inventors: Sebastian M. Laurent, Greenwell Springs; Robert N. Sanders, Baton Rouge, both of La.

[73] Assignee: Ethyl Corporation, Richmond, Va.

[*] Notice: The portion of the term of this patent subsequent to Dec. 3, 2002 has been disclaimed.

[21] Appl. No.: 82,256

[22] Filed: Aug. 6, 1987

Related U.S. Application Data

[60] Continuation-in-part of Ser. No. 934,457, Nov. 24, 1986, Pat. No. 4,759,932, Ser. No. 934,458, Nov. 24, 1986, Ser. No. 934,460, Nov. 24, 1986, Ser. No. 934,461, Nov. 24, 1986, and Ser. No. 846,188, Mar. 31, 1986, abandoned, which is a continuation of Ser. No. 741,572, Jun. 5, 1985, abandoned, which is a division of Ser. No. 475,370, Mar. 14, 1983, Pat. No. 4,556,564, said Ser. No. 934,457, Ser. No. 934,458, Ser. No. 934,460, and Ser. No. 934,461, each is a continuation-in-part of Ser. No. 846,188.

[51] Int. Cl.$^4$ ................................. A23K 1/24
[52] U.S. Cl. .......................... 426/2; 426/74; 426/271; 426/623; 426/630; 426/807
[58] Field of Search ............. 426/2, 74, 623, 630, 426/271, 807

[56] References Cited

U.S. PATENT DOCUMENTS

| | | | |
|---|---|---|---|
| 3,370,953 | 2/1968 | Nakano | 426/2 |
| 3,836,676 | 9/1974 | Komakine | 426/74 |
| 4,515,780 | 5/1985 | Laurent et al. | 424/154 |
| 4,556,564 | 12/1985 | Laurent et al. | 426/74 |
| 4,610,882 | 9/1986 | Laurent et al. | 426/2 |
| 4,610,883 | 9/1986 | Laurent et al. | 426/2 |

FOREIGN PATENT DOCUMENTS

| | | |
|---|---|---|
| 939186 | 1/1974 | Canada ............. 99/30 |
| 0119992 | 9/1984 | European Pat. Off. |
| 0224856 | 6/1987 | European Pat. Off. |
| 59-203450 | 11/1984 | Japan |

OTHER PUBLICATIONS

Hawley, "The Condensed Chemical Dictionary", Tenth Edition, pp. 537 and 1105–1106, Von Nostrand Reinhold Publishers, 1982.

Reagan, Luther M., *Effects of Adding Zeolites to the Diets of Broiler Cockerels;* Thesis Recommended for Acceptance, 4/25/84; Colorado State University.

Nolen et al., *Food & Cosmetic Toxicology,* 21, (5), p. 697, (1983).

Carlisle, *Nutrition Reviews,* 40(7), pp. 193–198, (1982).

Carlisle, Chapter Four of *Silicon* & Siliceous Structures in Biol. Systems, Simpson, T. L., ed., B. E. Springer Verlag, NY, (1981), pp. 69–94.

Edwards, *Poultry Science,* vol. 65, Suppl. No. 1, (1986).

Roland et al., *Poultry Science* 64, 1177–1187, (1985).

Miles et al., *Nutrition Reports International* 34, No. 6, 1097–1103, (Dec. 1986).

Ingram et al., *Influence of ETHACAL Feed Component on Production Parameters of White Leghorn Hens During High Temperatures.*

Hatieganu et al., *Buletinul Institutului Agronomic Cluj-Napoca, Zootehnie si Medicina* 33, 27–34, (1979).

F. A. Mumpton & P. H. Fishman, Journal of Animal Science, vol. 45, No. 5, (1977), pp. 1188–1203.

C. Y. Chung et al., Nongsa Sihom Youngu Pogo 1978, 20, (Livestock pp. 77–83).

H. S. Nakaue, 1981, Poultry Science 60:944–949.

Larry Vest and John Shutze, "The Influence of Feeding Zeolites to Poultry Under Field Conditions"; Zeo-Agriculture '82.

*Primary Examiner*—R. B. Penland
*Attorney, Agent, or Firm*—John F. Sieberth

[57] ABSTRACT

A method of improving feathering of poultry, which comprises feeding poultry a diet containing a small amount of zeolite.

11 Claims, No Drawings

METHOD OF IMPROVING FEATHERING IN BIRDS

CROSS-REFERENCE TO RELATED APPLICATIONS

This is a continuation-in-part of each of the following four applications: Ser. No. 934,457, now U.S. Pat. No. 4,759,932, Ser. No. 934,460, Ser. No. 934,458, and Ser. No. 934,461, all filed on Nov. 24, 1986, each of which is a continuation-in-part of application Ser. No. 846,188 filed Mar. 31, 1986, now abandoned; and a continuation-in-part of said application Ser. No. 846,188, which is a continuation of application Ser. No. 741,572 filed on June 5, 1985, now abandoned, which in turn is a division of application Ser. No. 475,370 filed Mar. 14, 1983, now U.S. Pat. No. 4,556,564.

BACKGROUND OF THE INVENTION

The present invention is in the general field of bird raising, especially poultry farming and relates particularly to controlled feeding of birds or feathered vertebrates to improves feathering or feathering characteristics.

The demand for meat and eggs, including poultry and poultry eggs, especially chickens and chicken eggs has expanded considerably over the last decade. The poultry industry has grown from a home industry to a large scale manufacturing industry in which thousands of chickens and tens of thousands of eggs are produced daily at single poultry farms or egg laying installations.

Healthy feathering is particularly important to several aspects of the poultry industry. Well feathered birds control their body temperature better and their carcasses are better protected from bruises, breast blisters, and other physical damages.

There is also a large duck industry that is particularly directed toward down production, in addition to production of culinary, gourmet foods.

In the turkey industry, early complete feathering is a very desirable, economic parameter.

Furthermore, poultry feather meal is a very high protein by-product feedstuff for animal diets. Improved feathering adds to the quality of this by-product.

We have found that the inclusion of zeolite, especially zeolite A in the diets of birds will substantially improve their feathering. Studies indicate that improved feathering results when a small amount of zeolite A is a regular component in poultry diets.

We have previously discovered that the strength of poultry eggshells can be substantially enhanced by adding a small amount of zeolite A to the diet of the laying poultry.

In addition to demonstrating increased eggshell strength as described in our U.S. Pat. No. 4,556,564, improved feed utilization efficiency, and increased egg size as described in our U.S. Pat. No. 4,610,882, decreased mortality rate as described in our U.S. Pat. No. 4,610,883, and increased bone strength, as set forth in our copending U.S. application Ser. No. 801,596, our continuing studies have also demonstrated that the regular feeding of small amounts of zeolite A to poultry produces the following positive results:

1. Improved feathering (broilers).
2. Calmer birds, reduced activity (layers).
3. Extended lay cycle duration (layers and broiler breeders).
4. Reduced condemnation of meat because of physical damage to living birds (broilers).
5. Improved resistance to heat stress, a multifaceted benefit.
6. Improved lean/fat ratio in the edible carcass.

The advantages of larger eggs, extended lay cycles, reduced condemnations and improved lean/fat ratio are self-evident. Calmer birds produce more eggs and lay with greater regularity. Also, fewer eggs are deformed. Heat stress is a highly negative factor among laying hens. Improved feathering correlates with healthier and stronger birds.

Zeolites are crystalline, hydrated aluminosilicates of alkali and alkaline earth cations, having infinite, three-dimensional structures.

Zeolites consist basically of a three-dimensional framework of $SiO_4$ and $AlO_4$ tetrahedra. The tetrahedra are cross-linked by the sharing of oxygen atoms so that the ratio of oxygen atoms to the total of the aluminum and silicon atoms is equal to two or $O/(Al+Si)=2$. The electrovalence of each tetrahedra containing aluminum is balanced by the inclusion in the crystal of a cation, for example, a sodium ion. This balance may be expressed by the formula $Al/Na=1$. The spaces between the tetrahedra are occupied by water molecules prior to dehydration.

Zeolite A may be distinguished from other zeolites and silicates on the basis of their composition and X-ray powder diffraction patterns and certain physical characteristics. The X-ray patterns for these zeolites are described below. The composition and density are among the characteristics which have been found to be important in identifying these zeolites.

The basic formula for all crystalline sodium zeolites may be represented as follows:

$$Na_2O.Al_2O_3.xSiO_2.yH_2O$$

In general, a particular crystalline zeolite will have values for "x" and "y" that fall in a definite range. The value "x" for a particular zeolite will vary somewhat since the aluminum atoms and the silicon atoms occupy essentially equivalent positions in the lattice. Minor variations in the relative number of these atoms do not significantly alter the crystal structure or physical properties of the zeolite. For zeolite A, the "x" value normally falls within the range $1.85\pm0.5$.

The value for "y" is not necessarily an invariant for all samples of zeolites. This is true because various exchangeable ions are of different size, and, since there is no major change in the crystal lattice dimensions upon ion exchange, the space available in the pores of the zeolite to accommodate water molecules varies.

The average value for "y" for zeolite A is 5.1. The formula for zeolite A may be written as follows:

$$1.0\pm0.2Na_2O.Al_2O_3.1.85\pm0.5SiO_2.yH_2O$$

In the formula, "y" may be any value up to 6.

An ideal zeolite A has the following formula:

$$(NaAlSiO_4)_{12}.27H_2O$$

Among the ways of identifying zeolites and distinguishing them from other zeolites and other crystalline substances, the X-ray powder diffraction pattern has been found to be a useful tool. In obtaining the X-ray powder diffraction patterns, standard techniques are employed. The radiation is the Kα doublet of copper and a Geiger counter spectrometer or a suitable radiation detector with a strip chart pen recorder is used. The peak heights, I, and the positions as a function of 2θ where θ is the Bragg angle, are read from a spectrometer chart or accumulated in computer memory. From these, the relative intensities, 100 $I/I_o$, where $I_o$ is the intensity of the strongest line or peak and d the interplanar spacing in angstroms corresponding to the record lines are calculated.

X-ray powder diffraction data for a sodium zeolite A are given in Table I.

TABLE I
X-RAY DIFFRACTION PATTERN FOR ZEOLITE A

| $h^2 + k^2 + l^2$ | d (Å) | $\frac{100 \, I}{I_o}$ |
|---|---|---|
| 1 | 12.29 | 100 |
| 2 | 8.71 | 70 |
| 3 | 7.11 | 35 |
| 4 | 6.15 | 2 |
| 5 | 5.51 | 25 |
| 6 | 5.03 | 2 |
| 8 | 4.36 | 6 |
| 9 | 4.107 | 35 |
| 10 | 3.895 | 2 |
| 11 | 3.714 | 50 |
| 13 | 3.417 | 16 |
| 14 | 3.293 | 45 |
| 16 | 3.078 | 2 |
| 17 | 2.987 | 55 |
| 18 | 2.904 | 10 |
| 20 | 2.754 | 12 |
| 21 | 2.688 | 4 |
| 22 | 2.626 | 20 |
| 24 | 2.515 | 6 |
| 25 | 2.464 | 4 |
| 26 | 2.414 | >1 |
| 27 | 2.371 | 3 |
| 29 | 2.289 | 1 |
| 30 | 2.249 | 3 |
| 32 | 2.177 | 7 |
| 33 | 2.144 | 10 |
| 34 | 2.113 | 3 |
| 35 | 2.083 | 4 |
| 36 | 2.053 | 9 |
| 41 | 1.924 | 7 |
| 42 | 1.901 | 4 |
| 44 | 2.858 | 2 |
| 45 | 1.837 | 3 |
| 49 | 1.759 | 2 |
| 50 | 1.743 | 13 |
| 53 | 1.692 | 6 |
| 54 | 1.676 | 2 |
| 55 | 1.661 | 2 |
| 57 | 1.632 | 4 |
| 59 | 1.604 | 6 |

The more significant d values for zeolite A are given in Table II.

TABLE II
MOST SIGNIFICANT d VALUES FOR ZEOLITE A
d Value of Reflection in Å

| |
|---|
| 12.2 ± 0.2 |
| 8.7 ± 0.2 |
| 7.10 ± 0.15 |
| 5.50 ± 0.10 |
| 4.10 ± 0.10 |
| 3.70 ± 0.07 |
| 3.40 ± 0.06 |
| 3.29 ± 0.05 |
| 2.98 ± 0.05 |
| 2.62 ± 0.05 |

Occasionally, additional lines not belonging to the pattern for the zeolite appear in a pattern along with the X-ray lines characteristic of that zeolite. This is an indication that one or more additional crystalline materials are mixed with the zeolite in the sample being tested. Small changes in line positions may also occur under these conditions. Such changes in no way hinder the identification of the X-ray patterns as belonging to the zeolite.

The particular X-ray technique and/or apparatus employed, the humidity, the temperature, the orientation of the powder crystals and other variables, all of which are well known and understood to those skilled in the art of X-ray crystallography or diffraction can cause some variations in the intensities and positions of the lines. These changes, even in those few instances where they become large, pose no problem to the skilled X-ray crystallographer in establishing identities. Thus, the X-ray data given herein to identify the lattice for a zeolite, are not to exclude those materials which, due to some variable mentioned or otherwise known to those skilled in the art, fail to show all of the lines, or show a few extra ones that are permissible in the cubic system of that zeolite, or show a slight shift in position of the lines, so as to give a slightly larger or smaller lattice parameter.

A simpler test described in "American Mineralogist," Vol. 28, page 545, 1943, permits a quick check of the silicon to aluminum ratio of the zeolite. According to the description of the test, zeolite minerals with a three-dimensional network that contains aluminum and silicon atoms in an atomic ratio of $Al/Si = \frac{2}{3} = 0.67$, or greater, produce a gel when treated with hydrochloric acid. Zeolites having smaller aluminum to silicon ratios disintegrate in the presence of hydrochloric acid and precipitate silica. These tests were developed with natural zeolite and may vary slightly when applied to synthetic types.

U.S. Pat. No. 2,882,243 describes a process for making zeolite A comprising preparing a sodium-aluminum-silicate water mixture having an $SiO_2:Al_2O_3$ mole ratio of from 0.5:1 to 1.5:1, and $Na_2O/SiO_2$ mole ratio of from 0.8:1 to 3:1, and an $H_2O/Na_2O$ mole ratio of from 35:1 to 200:1, maintaining the mixture at a temperature of from 20° C. to 175° C. until zeolite A is formed, and separating the zeolite A from the mother liquor.

Experiments have been in progress in Japan since 1965 on the use of natural zeolite minerals as dietary supplements for poultry, swine and cattle. Significant increases in body weight per unit of feed consumed and in the general health of the animals was reported (Minato, Hideo, Koatsugasu 5: 536, 1968). Reductions in malodor were also noted.

Using clinoptilolite and mordenite from northern Japan, Onagi, T. (Rept. Yamagata Stock Raising Inst. 7, 1966) found that Leghorn chickens required less food and water and gained as much weight in a two-week trial as birds receiving a control diet. No adverse effects on health or mortality were noted. The foregoing Japanese experiments were reported by F. A. Mumpton and P. H. Fishman in the *Journal of Animal Science*, Vol. 45, No. 5 (1977) pp. 1188–1203.

U.S. Pat. No. 3,836,676 issued to Chukei Komakine in 1974 discloses the use of zeolites as adsorbent moisture of ferrous sulfate crystals in an odorless chicken feed comprising such crystals and chicken droppings. The results were said to be no less than those in the case where chickens were raised with ordinary feed.

Canadian Pat. No. 939,186 issued to White et al in 1974 discloses the use of zeolites having exchangeable cations as a feed component in the feeding of urea or buiret non-protein (NPR) compounds to ruminants, such as cattle, sheep and goats. Natural and synthetic as well as crystalline and non-crystalline zeolites are disclosed. Zeolites tested included natural zeolites, chabazite and clinoptilolite and synthetic zeolites X, Y, F, J, M, Z, and A. Zeolite F was by far the most outstanding and zeolite A was substantially ineffective.

An article by C. Y Chung et al from Nongsa Sihom Youngu Pogo 1978, 20 (Livestock) pp. 77–83 discusses the effects of cation exchange capacity and particle size of zeolites on the growth, feed efficiency and feed materials utilizability of broilers or broiling size chickens. Supplementing the feed of the broilers with naturally occurring zeolites, such as clinoptilolite, some increase in body weight gain was determined. Chung et al also reported that earlier results at the Livestock Experiment Station (1974, 1975, 1976—Suweon, Korea) showed that no significant difference was observed when 1.5, 3, and 4.5 percent zeolite was added to chicken layer diets.

A study by H. S. Nakaue of feeding White Leghorn layers clinoptilolite, reported in 1981 Poultry Science 60: 944–949, disclosed no significant differences in eggshell strength between hens receiving the zeolite in their diet and hens not receiving the zeolite in their diet.

In a recent study at the University of Georgia, both broilers and layers were fed small amounts (about 2%) of clinoptilolite, a naturally occurring zeolite from Tilden, Tex. The eggshells from the hens receiving zeolite were slightly more flexible as measured by deformation, slightly less strong as measured by Instron breaking strength, and had a slightly lower specific gravity. The differences in eggshell quality were very small. This type of zeolite was ineffective in producing a stronger eggshell. An article written by Larry Vest and John Shutze entitled "The Influence of Feeding Zeolites to Poultry Under Field Conditions" summarizing the studies was presented at Zeo-Agriculture '82.

An object of the present invention is to provide a diet for feathered animals which improves their feathering. Another object is to provide improved poultry feed. Still another object is to provide an improved process for feeding poultry and promoting feather growth.

Other objects and advantages of the invention will be more fully understood from a reading of the description and claims hereinafter.

SUMMARY OF THE INVENTION

The present invention relates to improving the feathering of feathered animals, by feeding a small amount of a zeolite.

DESCRIPTION OF THE PREFERRED EMBODIMENT

It has been discovered that the addition of a relatively small amount of zeolite to the diet of a feathered animal will improve the quality or increase the number of feathers of the feathered animal. Zeolite A is the preferred zeolite.

A typical feed preparation for large scale laying hen operations comprises approximately the following by weight percent:

| | |
|---|---|
| Corn | 50–70 |
| Soybean Meal | 15–25 |
| Limestone | 5–9 |
| Alfalfa Meal | 1 |
| Phosphates | 0.8–2.0 |
| Vitamins, Amino Acids | 0.1–1 |
| Salt and Other Minerals | |

To improve feathering, zeolite A is added to such a feed formulation in amounts of from about 0.25 to about 0.75 percent by weight of the total feed. A preferred amount of zeolite A is from about 0.3 to about 0.6 weight percent. Inclusion of amounts greater than about 0.75% by weight may not be a cost effective method for improving feathering. However, amounts in addition to 0.75 weight percent may confer other desirable benefits. As shown by our previous patents cited above, zeolite A can be efficaciously included in feed formulations in amounts of up to about 4 weight percent or higher.

ETHACAL® feed component (EFC), a commercially available sodium zeolite A, has the following typical characteristics:

| | |
|---|---|
| Form | Free flowing powder |
| Color | White |
| Bulk Density, lb/ft$^3$ | 23–29 |
| Mean Particle Size, microns | 3.0 |
| Theoretical Ion Exchange Capacity, milliequivalents per gram (anhydrous) | 7.0 |

A typical chemical analysis of ETHACAL® feed component is as follows:

| ELEMENT | % |
|---|---|
| Sodium (Na) | 12.6 |
| Alumininum (Al) | 14.8 |
| Silicon (Si) | 15.3 |
| Oxygen (O) | 35.1 |
| Water of hydration (H$_2$O) | 22.2 |
| Heavy Metals (Food Chemicals Codex Method) | less than 10 PPM |
| Lead (Food Chemicals Codex Method) | less than 10 PPM |

To demonstrate this invention, pens containing 5 male 3-week old broilers, replicated 8 times (40 birds per diet) were fed diets containing 0, 0.5, and 1.0% zeolite A until they were 7 weeks old. The birds were then sacrificed and dressed. Feather scores were obtained using the following scale:

| Score | Feather Condition |
|---|---|
| 1 | Complete - well developed feathers |
| 2 | Incomplete - some pin feathers |
| 3 | Incomplete - poorly developed feathers |

TABLE 1

| | TEST RESULTS | |
|---|---|---|
| Line | % Zeolite A in Diet | Feather Score |
| 1 | 0 | 1.40 |
| 2 | 0.5 | 1.28 |
| 3 | 1.0 | 1.39 |

Statistical analysis showed values on line 1 and 2 were different at the 95% confidence level.

In a commercial field trial utilizing 34,000 broilers, wherein 17,000 of the broilers were regularly fed a feed containing 0.5 weight percent zeolite A and 17,000 broilers were regularly fed a similar diet without zeolite A, carcass condemnation was reduced by 2 percent with the zeolite fed birds. Carcasses were condemned for such factors as bruises, breast blisters, and other physical damages.

The studies clearly show that zeolite A is effective in improving the quality of feathering in feathered animals, especially poultry.

The term poultry as used herein includes all domestic fowl, namely chickens, turkeys, ducks, geese, and the like.

It can be appreciated that a wide variety of nutrients or foods may be included in the diets of feathered animals. In a controlled environment, the animals are only exposed to desired foods or food products.

The composition of animal rations is obtained from or include many of the following ingredients:

Grain and processed grain by-products. Includes corn, corn hominy, corn germ meal, barley, millet, oats, rice, rice hulls, rye, sorghum, wheat and wheat shorts. These are among the energy ingredients, mostly carbohydrates with some proteins.

Plant protein products. Includes soybean oil meal, barley malt sprouts, coconut meal, corn distillers grain, corn gluten meal, cottonseed meal, pea seed, potato meal, peanut meal, rape seed meal, sunflower meal, wheat germ meal, brewers' yeast. All of these are principally protein sources.

Roughage or fiber. Includes dehydrated alfalfa, alfalfa hay, alfalfa leaf meal and pasture grasses. These are all fiber-rich sources.

Animal and fish by-products. Includes blood meal, blood flour, dried buttermilk, dried whey, dried casein, fish meal, dried fish solubles, liver meal, meat meal, meat meal tankage, feather meal, bone meal and dried skim milk. Anchovies, herring and menhaden are sources of fish meal.

Minerals and synthetic trace ingredients. Includes vitamins such as B-12, A, pantothenate, niacin, riboflavin, K, etc., DL methionine, choline chloride, folic acid, dicalcium phosphate, magnesium sulfonate, potassium sulfate, calcium carbonate (limestone, oyster shells), salt, sodium selenite, manganous oxide, calcium iodate, copper oxide, zinc oxide and D activated animal sterol.

Molasses and animal fats are added to improve palatability and to increase or balance the energy levels.

Preservatives are also added such as Ethoxyquin TM and sodium sulfite.

The foregoing disclosure and description of the invention is illustrative and explanatory thereof and various changes in the described emobdiments may be made within the scope of the appended claims without departing from the spirit of the invention.

What is claimed is:

1. A method of improving the feathering of feathered animals, said method comprising regularly feeding to said animals a small effective amount of zeolite A, sufficient to improve the feathering of said feathered animals.

2. A method of claim 1, wherein said zeolite is contained within a poultry feed.

3. The method of claim 2, wherein the amount of said zeolite in said feed is from about 0.25 weight percent to about 0.75 weight percent.

4. The method of claim 1, wherein the feathered animals are poultry.

5. A method of improving feathering in poultry, said method comprising regularly feeding a small, effective amount of zeolite A within the feed for said poultry, said amount being sufficient to improve the feathering of said poultry.

6. The method of claim 5, wherein the amount of said zeolite added is an effective amount up to about 0.75 weight percent of the feed.

7. The method of claim 5, wherein the amount of said zeolite added to the feed is from about 0.25 to about 0.75 percent by weight.

8. The method of claim 5, wherein the amount of said zeolite added to the feed is about 0.5 weight percent.

9. A method of improving feathering in poultry, said method comprising administering to said poultry a small effective amount of zeolite A, sufficient to improve feathering in said poultry, said amount being of up to about 0.75 weight percent of feed regularly fed to said poultry.

10. The method of claim 9, wherein said zeolite A is a sodium zeolite A.

11. A method of improving a poultry feather product such as down or poultry feather meal, said process comprising regularly feeding to poultry a small, feathering improving amount of zeolite A added to the feed which is fed to said poultry, and subsequently separating feathers from said poultry after said poultry have been sacrificed.

* * * * *